United States Patent
Sarathy et al.

(10) Patent No.: US 11,708,805 B2
(45) Date of Patent: Jul. 25, 2023

(54) ENGINE AND POWER CYCLES FUELED BY PERFORMIC ACID OR FORMIC ACID

(71) Applicant: KING ABDULLAH UNIVERSITY OF SCIENCE AND TECHNOLOGY, Thuwal (SA)

(72) Inventors: Subram Maniam Sarathy, Thuwal (SA); Vijai Shankar Bhavani Shankar, Thuwal (SA); Samah Y Mohamed, Thuwal (SA); Eshan Singh, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 237 days.

(21) Appl. No.: 17/295,895

(22) PCT Filed: Nov. 22, 2019

(86) PCT No.: PCT/IB2019/060077
§ 371 (c)(1),
(2) Date: May 21, 2021

(87) PCT Pub. No.: WO2020/121090
PCT Pub. Date: Jun. 18, 2020

(65) Prior Publication Data
US 2022/0010754 A1    Jan. 13, 2022

Related U.S. Application Data

(60) Provisional application No. 62/777,403, filed on Dec. 10, 2018.

(51) Int. Cl.
*F02M 25/025* (2006.01)
*F01K 25/10* (2006.01)
(Continued)

(52) U.S. Cl.
CPC ......... *F02M 25/025* (2013.01); *F01K 25/103* (2013.01); *F02M 21/0209* (2013.01); *F02M 21/0221* (2013.01); *F02M 31/20* (2013.01)

(58) Field of Classification Search
CPC ............. F02M 25/025; F02M 21/0209; F02M 21/0221; F02M 31/20; F01K 25/103; F02B 43/10; Y02T 10/30; Y02T 90/40
(Continued)

(56) References Cited

U.S. PATENT DOCUMENTS

| | | |
|---|---|---|
| 8,596,075 B2 | 12/2013 | Allam et al. |
| 9,115,605 B2 | 8/2015 | Held et al. |

(Continued)

FOREIGN PATENT DOCUMENTS

| | | |
|---|---|---|
| ES | 2341519 A1 | 6/2010 |
| WO | 2016019357 A1 | 2/2016 |

OTHER PUBLICATIONS

Brockhinke, A., et al., "Clean Combustion—Perspectives from Chemistry and Diagnostics," ZiF-Mitteilungen, Bielefeld University, Mar. 31, 2017, pp. 19-32.

(Continued)

*Primary Examiner* — Hai H Huynh
(74) *Attorney, Agent, or Firm* — Patent Portfolio Builders PLLC

(57) ABSTRACT

An emission-free power generation system includes a combustion chamber having a first inlet for receiving a fuel and a closed-loop fluidic circuit fluidly connected between a second inlet of the combustion chamber and an outlet of the combustion chamber. Combustion gases from the combustion chamber include only water and carbon dioxide, and the fuel includes performic acid or a combination of formic acid and hydrogen peroxide.

20 Claims, 11 Drawing Sheets

(51) Int. Cl.
*F02M 21/02* (2006.01)
*F02M 31/20* (2006.01)

(58) Field of Classification Search
USPC .......................... 123/1 A, 2, 3, 25 C, 568.12
See application file for complete search history.

(56) References Cited

U.S. PATENT DOCUMENTS

| 10,018,115 B2 | 7/2018 | Allam et al. |
| 2002/0005190 A1 | 1/2002 | Bianchi |
| 2011/0239962 A1 | 10/2011 | Mungas et al. |
| 2017/0064949 A1 | 3/2017 | Kraus et al. |

OTHER PUBLICATIONS

PCT International Search Report and Written Opinion of the International Searching Authority (Forms PCT/ISA/220, PCT/ISA/210 and PCT/ISA/237) for corresponding/related International Application No. PCT/IB2019/060077, dated Feb. 3, 2020.

Pérez-Fortes, M., et al., "Formic acid synthesis using $CO_2$ as raw material: Techno-economic and environmental evaluation and market potential," International Journal of Hydrogen Energy, Jun. 2016, pp. 1-19 (20 pages total).

ENGINE AND POWER CYCLES FUELED BY PERFORMIC ACID OR FORMIC ACID

CROSS-REFERENCE TO RELATED APPLICATIONS

This application is a U.S. National Stage Application of International Application No. PCT/IB2019/060077, filed on Nov. 22, 2019, which claims priority to U.S. Provisional Patent Application No. 62/777,403, filed on Dec. 10, 2018, entitled "EMISSION FREE CLOSED LOOP CARBON DIOXIDE POWER CYCLES FUELED BY FORMIC ACID, HYDROGEN PEROXIDE, AND PERFORMIC ACID," the disclosures of which are incorporated herein by reference in their entirety.

BACKGROUND

Technical Field

Embodiments of the subject matter disclosed herein generally relate to a system and method for using a closed-loop carbon dioxide power cycle for de-carbonizing the power generation sector, and more particularly, to develop a power generation system that generates heat and/or work without the need for air separation or pure oxygen.

Discussion of the Background

The generation of $CO_2$ by the existing power generation systems poses a threat to the environment. A power generation system is considered herein to be any device that generates heat or work, for example, the engine of a vehicle, a power station that generates electricity, etc. There is a growing need to address issues related to climate change by limiting the amount of greenhouse gases emitted to the atmosphere. It is widely accepted that the energy generation sector is a primary contributor to greenhouse gas emissions, and decarbonization of the energy sector is a proposed solution.

Combustion based power generation systems offer the advantages of low-cost, high-reliability, high-power, and wide operating ranges. Liquid hydrocarbon chemicals offer significant advantages in terms of energy storage density and storage capability. However, the major drawback of the combustion systems powered by liquid hydrocarbon fuels is the generation of carbon dioxide ($CO_2$). Even completely renewable fuels such as methanol, ethanol, or other chemicals produced from renewable feedstocks produce $CO_2$ when combusted with air. Any $CO_2$ produced from a combustion system must be captured and permanently sequestered to avoid impacts on the climate change. The separation of dilute $CO_2$ streams from $N_2$ (from air) in the exhaust of the power generation system is an energy intensive and expensive process. One option is to burn the hydrocarbon fuel with pure $O_2$ (i.e., oxy-fuel combustion) to prevent or reduce the generation of $CO_2$, but such processes require dedicated air separation units to separately produce high-purity oxygen. Such systems are also expensive and energy intensive, while pure oxygen is difficult to store and distribute.

Thus, there is a need for an alternative combustion power cycle that generates a high-purity $CO_2$ exhaust stream without the need for an air separation unit or the use of pure oxygen.

BRIEF SUMMARY OF THE INVENTION

According to an embodiment, there is an emission-free power generation system that includes a combustion chamber having a first inlet for receiving a fuel, and a closed-loop fluidic circuit fluidly connected between a second inlet of the combustion chamber and an outlet of the combustion chamber. Combustion gases from the combustion chamber include only water and carbon dioxide, and the fuel includes performic acid or a combination of formic acid and hydrogen peroxide.

According to another embodiment, there is an emission-free vehicle that includes a frame connected to one or more wheels, a combustion chamber attached to the frame and having a first inlet for receiving a fuel, a closed-loop fluidic circuit fluidly connected between a second inlet of the combustion chamber and an outlet of the combustion chamber, and a gearbox that transfers work generated by the combustion chamber to one or more wheels to generate propulsion. Combustion gases from the combustion chamber include only water and carbon dioxide, and the fuel includes performic acid or a combination of formic acid and hydrogen peroxide.

According to still another embodiment, there is a method for generating heat by using an emission-free power generation system, and the method includes receiving a fuel at a first inlet of a combustion chamber; receiving a first stream (S1) of carbon dioxide at a second inlet of the combustion chamber; combusting the fuel inside the combustion chamber in the presence of the first stream (S1) of the carbon dioxide; and expelling only water and carbon dioxide as a product of the combustion of the fuel. A closed-loop fluidic circuit fluidly connects between the second inlet of the combustion chamber and an outlet of the combustion chamber, so that none of the carbon dioxide is released outside the power generation system, and the fuel includes performic acid or a combination of formic acid and hydrogen peroxide.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an internal combustion system that uses performic acid for generating work and/or heat. However, the embodiments to be discussed next are not limited to internal combustion systems or performic acid, but may be applied to other types of power generation systems, for example, gas turbine, and may use other fuel, for example, formic acid and hydrogen peroxide.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel power generation system generates a high-purity $CO_2$ exhaust stream without the need for an air separation unit or pure oxygen. The reactant(s) for this engine can be either performic acid or a mixture of formic acid and hydrogen peroxide. The power cycle produces high-purity $CO_2$ that can be compressed and stored, or recycled to produce more the reactants together with renewable hydrogen.

Figure 1:
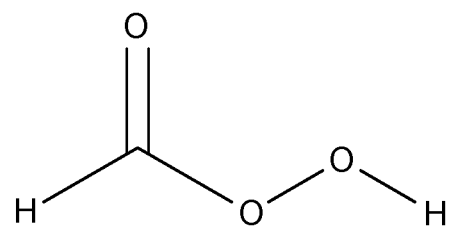
FIG. 1 illustrates the chemical structure of the performic acid.

One possible implementation of such a power generation system is based on the use of the performic acid as the fuel. The performic acid, called herein PFA, has the chemical structure shown in FIG. 1 and has the chemical formula $CH_2O_3$ or $HO_2CHO$. Note that the intersection of two single lines with a double line in the figures indicate the presence of a carbon C. The molecule of the PFA shown in FIG. 1 is unique in that it has all the oxygen required for its complete combustion, so no external oxidizer is required, and the products of the unimolecular reaction are $CO_2$ and $H_2O$. A unimolecular reaction is a chemical reaction in which a single molecule, for example, the PFA, breaks itself into two molecules, for example, $CO_2$ and $H_2O$. The fact that the PFA molecule has all the necessary oxygen means that the chemical reaction involving the PFA does not need the presence of air. This is advantageous because the lack of air removes the presence of N, and thus, the resulting by-products, after generating the energy, are only $CO_2$ and $H_2O$, which can be easily separated from each other. Note that the biggest challenge to the existing combustion engines is to separate the $CO_2$ from the N present in the added air.

Figure 2:
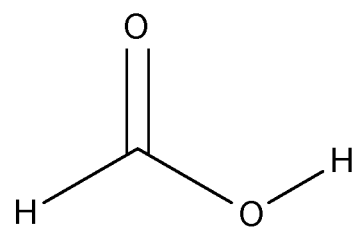
FIG. 2 illustrates the chemical structure of the formic acid.
Figure 3:
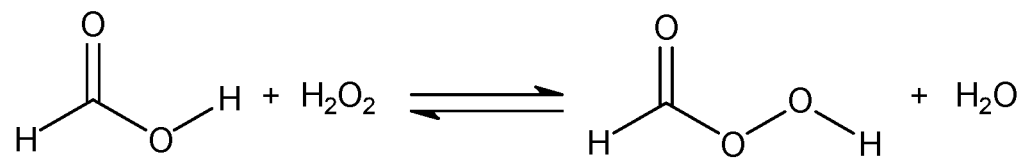
FIG. 3 illustrates a chemical reaction between formic acid and hydrogen peroxide that generates performic acid.

The performic acid (PFA) can be produced from the reaction of formic acid (HOCHO), which is shown in FIG. 2 and hydrogen peroxide ($H_2O_2$), as shown in FIG. 3. The performic acid has also been detected during the oxidation of dimethyl ether (DME) and thus, this reaction can also be used to generate the PFA. When equimolar amounts of formic acid and hydrogen peroxide are reacted, the resulting solution contains approximately 48% performic acid and the rest is water. Higher concentrations solutions can be achieved using sulfuric acid as a catalyst followed by distillation. The performic acid is safe and non-toxic in dilute concentrations, but its vapors may cause skin and mucous membrane irritation. The performic acid is a highly reactive peracid. At 0° C., the PFA molecule can decompose in 24 hours to lose about 25% of its oxygen content, and it violently explodes when heated above 80° C.

Figure 4:
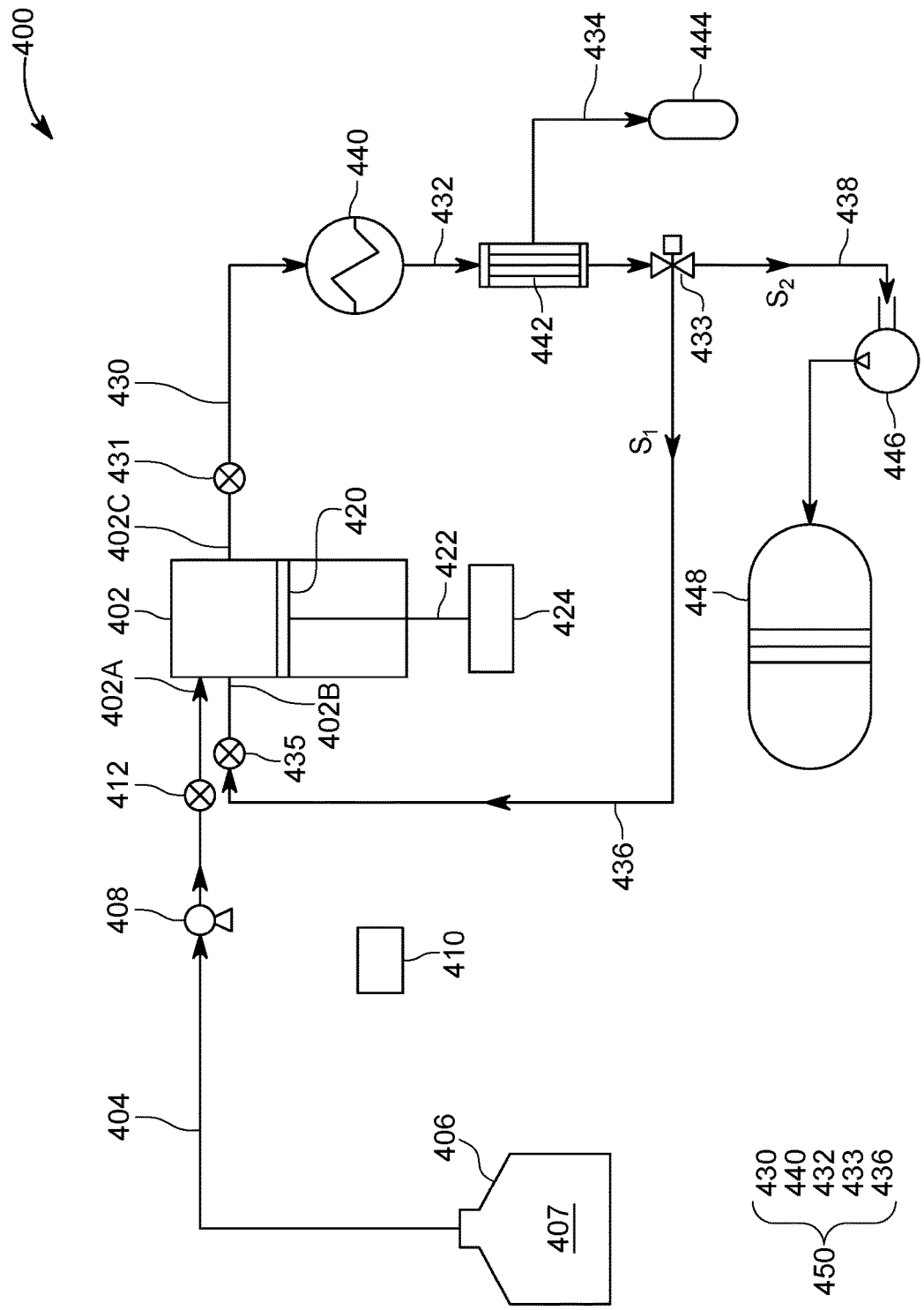
FIG. 4 illustrates a power generation system that uses only performic acid as fuel.

The power generation system 400 shown in FIG. 4 utilizes the unimolecular decomposition of the PFA to generate heat, which can be transformed into work, as discussed later. More specifically, FIG. 4 shows the system 400 including a combustion chamber 402 that is connected through fuel pipe 404 to a fuel tank 406. The fuel tank 406 stores the fuel 407. The fuel 407 may include only performic acid, or only performic acid and water, or only performic acid and carbon dioxide, or only performic acid, carbon dioxide, and water. For simplicity, in this embodiment the fuel is considered to be PFA fuel.

A pump 408 is fluidly connected to the fuel pipe 404 and is configured, under the control of the controller 410, to inject the PFA fuel 407 into the combustion chamber 402, at a first inlet 402A. A valve 412 may be placed along the fuel pipe 404, between the pump 408 and the combustion chamber 402, to control the amount of fuel 407 that is injected into the combustion chamber. The combustion chamber may be a traditional internal combustion engine.

If the combustion chamber 402 is a traditional internal combustion engine, it may have a piston 420 that is connected through a connecting rod 422 to a crankshaft 424. When the fuel 407 enters the combustion chamber 402, at a high pressure and high temperature, the fuel is combusted in the presence of $CO_2$, further increasing the pressure inside the combustion chamber, which makes the piston 420 to move downward in the figure, and to rotate the crankshaft 424, thus transforming the generated heat into work. More combustion chambers 402 may be used to generate more power and a smoother rotation of the crankshaft 424. The crankshaft 424 may be connected, through a gearbox to the wheels of a vehicle to propel the vehicle, or to a turbine to generate electricity, etc.

As the performic acid 407 is injected into the high-pressure, high temperature $CO_2$ of the combustion chamber 402, it reacts to produce heat with only $CO_2$ and $H_2O$ as the by-products. Note that the environment inside the combustion chamber 402 is made up of only $CO_2$. The $CO_2$ inside the combustion chamber 402 may have a temperature between 300 and 1000° C., and a pressure between 1 and 40 atm and it is supplied by pipe 436 at the second inlet 402B as discussed later. The heat generated by the combustion of the fuel 407 can be converted to work using one of various thermal power cycles (e.g., the piston expansion as discussed above, or a turbine, or a rankine cycle, etc.).

The resulting $CO_2$ and $H_2O$, i.e., the combusted gases, are allowed to exit the combustion chamber 402 at an outlet 402C, through a pipe 430. A valve 431 may be located on the pipe 430 for controlling the amount of combusted gases exiting the combustion chamber. The $CO_2$ and $H_2O$ are driven to a heat exchanger 440, where the gases are cooled before the water is separated. The cooled $CO_2$ and $H_2O$ gases are then sent along pipe 432 to a condenser 442, where the water is separated from the carbon dioxide. The water is removed along pipe 434 to a fresh water tank 444. The remaining $CO_2$ is split at the valve 433 into two streams, a first stream S1, which is sent along pipe 436 back to the combustion chamber 402, and a second stream S2, which is sent along pipe 438, to a compressor 446, for being compressed and stored in a storage tank 448. The first stream S1 closes the closed-loop fluidic circuit 450 by entering back into the combustion chamber at second inlet 402B. The closed-loop fluidic circuit 450 includes pipe 430, heat exchanger 440, pipe 432, condenser 442, valve 433, and pipe 436. The closed-loop fluidic circuit 450 is connected with one end to the second inlet 402B of the combustion chamber 402 and with another end to the outlet 402C of the combustion chamber 402. The combustion gases (i.e., water and carbon dioxide) travel together along a first part of the closed-loop fluidic circuit, then the water is removed at the condenser 442, and a part of the carbon dioxide is then removed at the valve 433. The controller 410 is programmed to remove a desired amount of carbon dioxide (the second stream S2) at the valve 433, i.e., to determine the amount of carbon dioxide forming the first stream S1. In one application, the controller 410 is programmed to dynamically adjust the amount of carbon dioxide constituting the first stream S1. In this way, the entire carbon dioxide produced by the combustion of the fuel 407 in the combustion chamber 402 is fully contained inside the closed-loop fluidic circuit 450 and the storage tank 448, so that no carbon dioxide is released into the environment. In addition, no oxygen or air is used by the combustion chamber or any other component of the system 400.

In this way, the first stream S1 of pure $CO_2$ is recycled to the inlet 402B of the combustion chamber 402, and thus, the first stream S1 of $CO_2$ serves as the working fluid for the power generation cycle of the power generation system 400. The excess $CO_2$ in the exhaust, i.e., the second stream S2, which is not recycled to the combustion chamber 402, is compressed and stored. This high-purity $CO_2$ second stream S2 may be readily sequestered or used as a chemical feedstock. Note that an optional valve 435 may be fluidly connected to the second inlet 402B of the combustion chamber 402 for controlling the first stream of $CO_2$. In one embodiment, the controller 410 is in communication with the valves 412, 431, 435, pump 408, and compressor 446 and is configured to control each of them to achieve a desired cycle, for example, Otto, Diesel, Brayton, Allam, Miller, Atkinson, or Rankine. Other cycles may also be implemented with the system shown in FIG. 4.

The heat in the exhaust gases can be recuperated by heating the re-circulated $CO_2$ first stream S1. The fuel 407 can be combusted in the combustion chamber 402 in various manners, such as premixed, non-premixed, compression ignited, spark ignited, etc. The first stream S1 of $CO_2$ in the cycle can be below or above its supercritical point. The $CO_2$ stored in the tank 448 can be stored or utilized in a variety of other manners, including production of formic acid using renewable electricity.

The power generation system 400 with the $CO_2$ stream as the working fluid and reactant including the PFA produces no net $CO_2$ emissions to the environment. Furthermore, the PFA can be entirely produced from $CO_2$ and $H_2O$ (the products of the combustion process) with the aid of renewable electricity. For example, renewable energy could be used to convert $H_2O$ to $H_2O_2$ using the common anthraquinone process. Renewable electricity could also be used to produce $H_2$ which can be reacted with $CO_2$ in the presence of a catalyst to produce the formic acid. The renewable formic acid and $H_2O_2$ can be reacted with each other in stoichiometric proportions in the presence of a catalyst to produce performic acid and water, as illustrated in FIG. 3.

When combusted, the performic acid already contains stoichiometric proportions of carbon, hydrogen, and oxygen to completely produce $CO_2$ and $H_2O$. Therefore, no oxidizer is needed when the fuel is performic acid and the fuel can be injected into a high-temperature high-pressure $CO_2$ environment present inside the combustion chamber 402 to generate heat and/or work.

Details of chemical reactions involved in PFA combustion are now discussed. Chemical kinetic modeling was performed to study the reactivity of PFA, $CO_2$, and $H_2O$ mixtures as the potential feed to the system 400. The reaction mechanism for PFA decomposition is not comprehensive. The following reactions were added to AramcoMech 2.0 to simulate PFA ($HO_2CHO$) decomposition following a free radical mechanism.

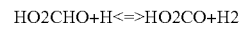

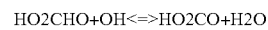

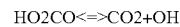

H-atom abstraction to form H and OH radicals from the aldehydic CH group were included in the kinetic model. The resulting radical quickly decomposes via a beta-scission reaction to produce $CO_2$ and OH radicals. This reaction sequence is a OH radical propagating scheme. In addition, the unimolecular decomposition of PFA to via scission of the weak O—OH bond to produce two radicals, OH and OCHO, was included in the model. The kinetics of this reaction were taken to be similar to unimolecular decomposition of ketohydroperoxides, wherein the activation energy is ~39 kcal/mol. Homogeneous batch reactor simulations were performed in CHEMKIN Pro and various results obtained for the system 400 are discussed later.

Given the unstable nature of the performic acid, the proposed combustion concept may also utilize a mixture of formic acid (FA) and hydrogen peroxide ($H_2O_2$) as the reactants instead of PFA. When reacted, these compounds can produce performic acid within the combustor, or react completely to produce $CO_2$ and $H_2O$ in an exothermic reaction. FA and $H_2O_2$ can be produced using renewable feedstocks. For example, $CO_2$ and renewable hydrogen can be reacted to produce FA, while $H_2O_2$ can also be produced from renewable resources.

Figure 5:
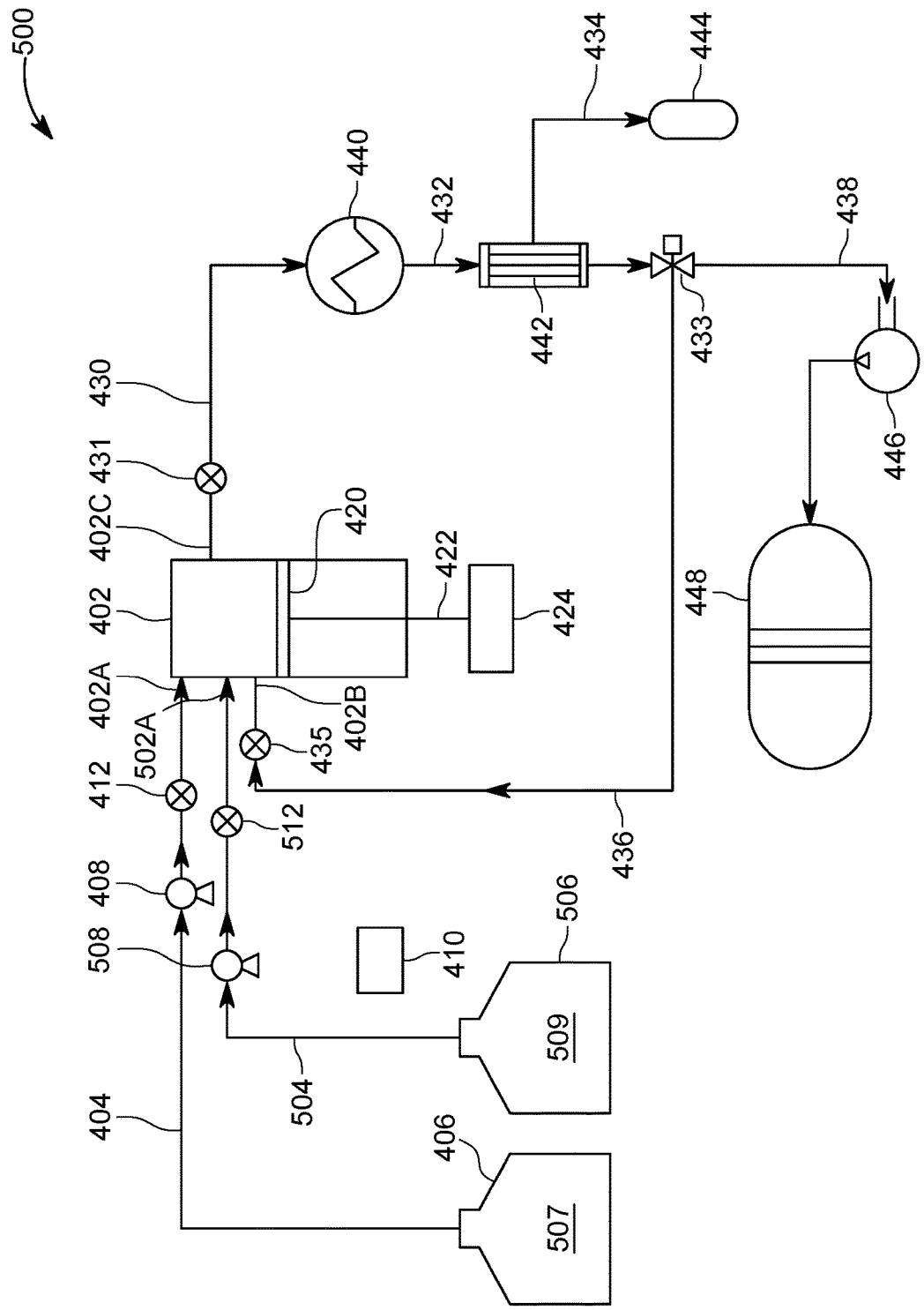
FIG. 5 illustrates a power generation system that uses only formic acid and hydrogen peroxide as fuel.

Thus, in another embodiment, as illustrated in FIG. 5, a power generation system 500 uses as fuel the formic acid 507 and the hydrogen peroxide 509. However, it is possible to use a fuel that includes only formic acid and hydrogen peroxide, or only formic acid, hydrogen peroxide and water, or only formic acid, hydrogen peroxide, and carbon dioxide, or only formic acid, hydrogen peroxide, carbon dioxide, and water. For simplicity, this embodiment uses a fuel that includes only the formic acid and the hydrogen peroxide.

The formic acid 507 is stored in a storing tank 406, similar to the system of FIG. 4, and the hydrogen peroxide 509 is stored in a second storing tank 506. The hydrogen peroxide 509 is provided through a pipe 504 to an input 502A of the combustion chamber 402. A pump 508 and a valve 512 may be provided along the pipe 504 for driving and controlling an amount of the fuel 509 to the combustion chamber 402. The remaining configuration of the power generation system 500 is similar to that of the system 400, and thus, the similar elements, which are denoted by the same reference numbers, are not described again herein.

As the formic acid 507 and the hydrogen peroxide 509 are injected into the high-pressure, high-temperature environment in the combustion chamber 402, they react to produce heat with only $CO_2$ and $H_2O$ as the final products. The heat can be converted to work using, for example, the piston 420, as discussed above. Those skilled in the art will understand that various other thermal power cycles, e.g., turbine, rankine cycle, etc. may be used for generating work. $H_2O$ is separated from the exhaust gas, similar to the system 400, using the condenser unit 442, and a portion of the remaining pure $CO_2$ stream (for example, between 20% and 80% of the produced $CO_2$) is recycled to the inlet 402B of the combustion chamber 402. In this way, $CO_2$ serves as the working fluid for the power generation cycle. The excess $CO_2$ in the exhaust that is not recycled to the combustion chamber is compressed with compressor 446 and stored in storage tank 448. This high purity $CO_2$ may be readily sequestered or used as a chemical feedstock.

This power generation cycle with $CO_2$ as the working fluid and reactants FA and $H_2O_2$ produces no net $CO_2$ emissions to the environment, similar to the power system 400. Furthermore, the two reactants can be entirely produced from $CO_2$ and $H_2O$ (the products of the combustion process) with the aid of renewable electricity. For example, renewable energy could be used to convert $H_2O$ to $H_2O_2$ using the common anthraquinone process. Renewable electricity could also be used to produce $H_2$ which can be reacted with $CO_2$ in the presence of a catalyst to produce formic acid. The FA and $H_2O_2$ can be directly injected into the high-temperature, high-pressure $CO_2$ environment of the combustion chamber 402 to generate heat and/or work.

The two power generation systems 400 and 500 shown in FIGS. 4 and 5 are just two possible implementations of an emission-free, closed-loop carbon dioxide power cycle that uses either PFA or FA and $H_2O_2$ as fuel. Those skilled in the art will understand that other physical implementations of this power cycle may be achieved, for example, by using a gas turbine. For these two specific implementations, various parameters, as the ignition delay time, the temperature, and the heat release rates have been simulated for indicating the performance of the systems 400 and 500.

Figure 6:
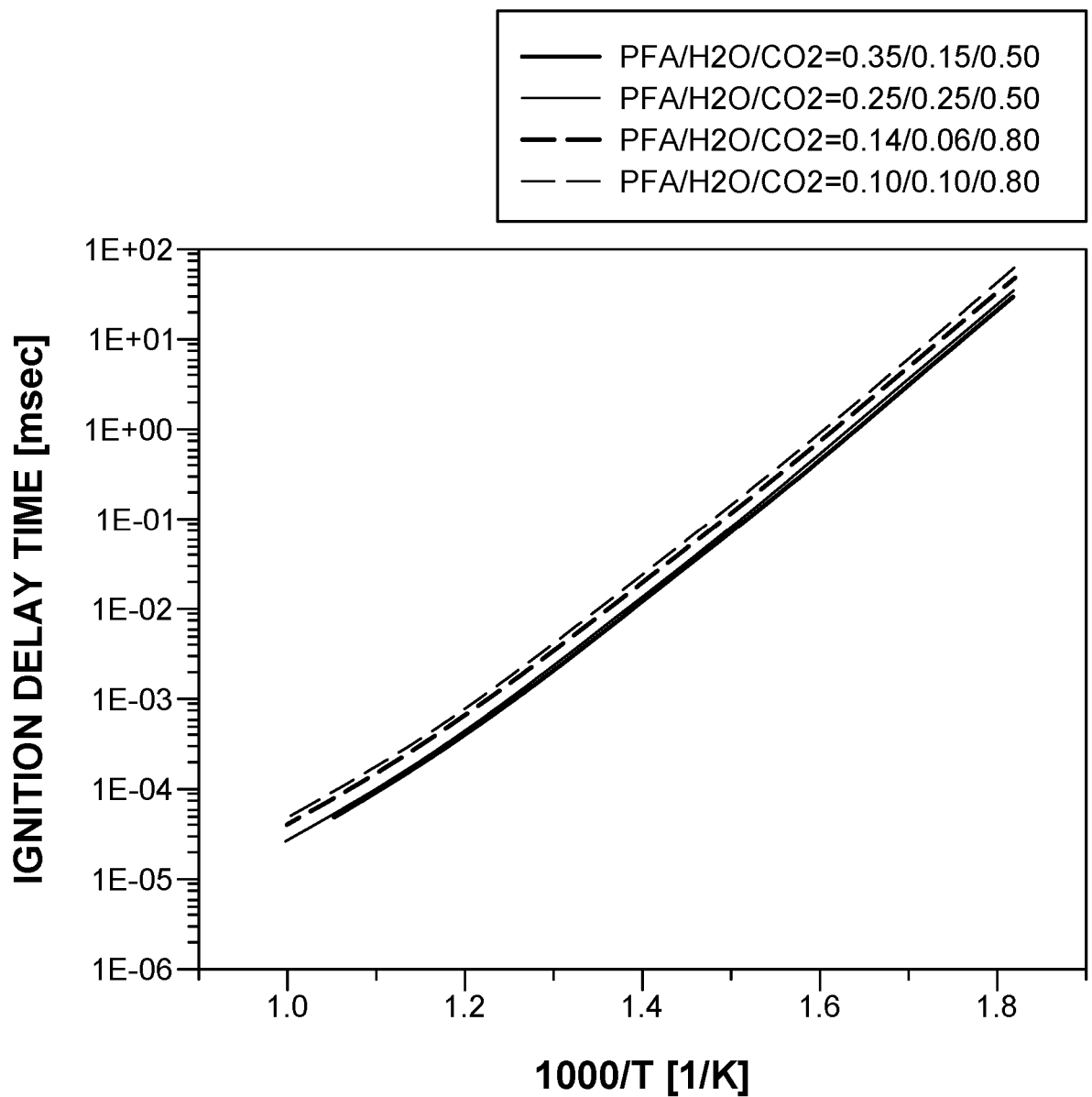
FIG. 6 illustrates the ignition delay time of various mixtures of performic acid, water and carbon dioxide when combusted.

In this regard, FIG. 6 shows the simulated ignition delay time for the system 400, performed in a closed homogeneous batch reactor model at 40 atm. Various mixtures of PFA with $H_2O$ (note that the fuel 407 includes a mixture of PFA and water) and $CO_2$ (this is the environment inside the combustion chamber 402) were simulated in this figure. The $CO_2$ fraction (i.e., the $CO_2$ supplied by the first stream S1) was varied from 80% to 50% (by mole) while the amount of PFA was varied between 0.10 to 0.35, and the amount of water was varied between 0.06 to 0.25. As the PFA is highly unstable on its own, simulations were performed with mixtures of PFA and $H_2O$. Similar reactivity is observed for the different mixtures of performic acid and water diluted with $CO_2$. Above 600 K, the ignition delay time is below 1 millisecond, and between 800-1000 K the mixtures ignite within 1 microsecond, which indicate that this fuel is appropriate for an internal combustion engine.

Figure 7:
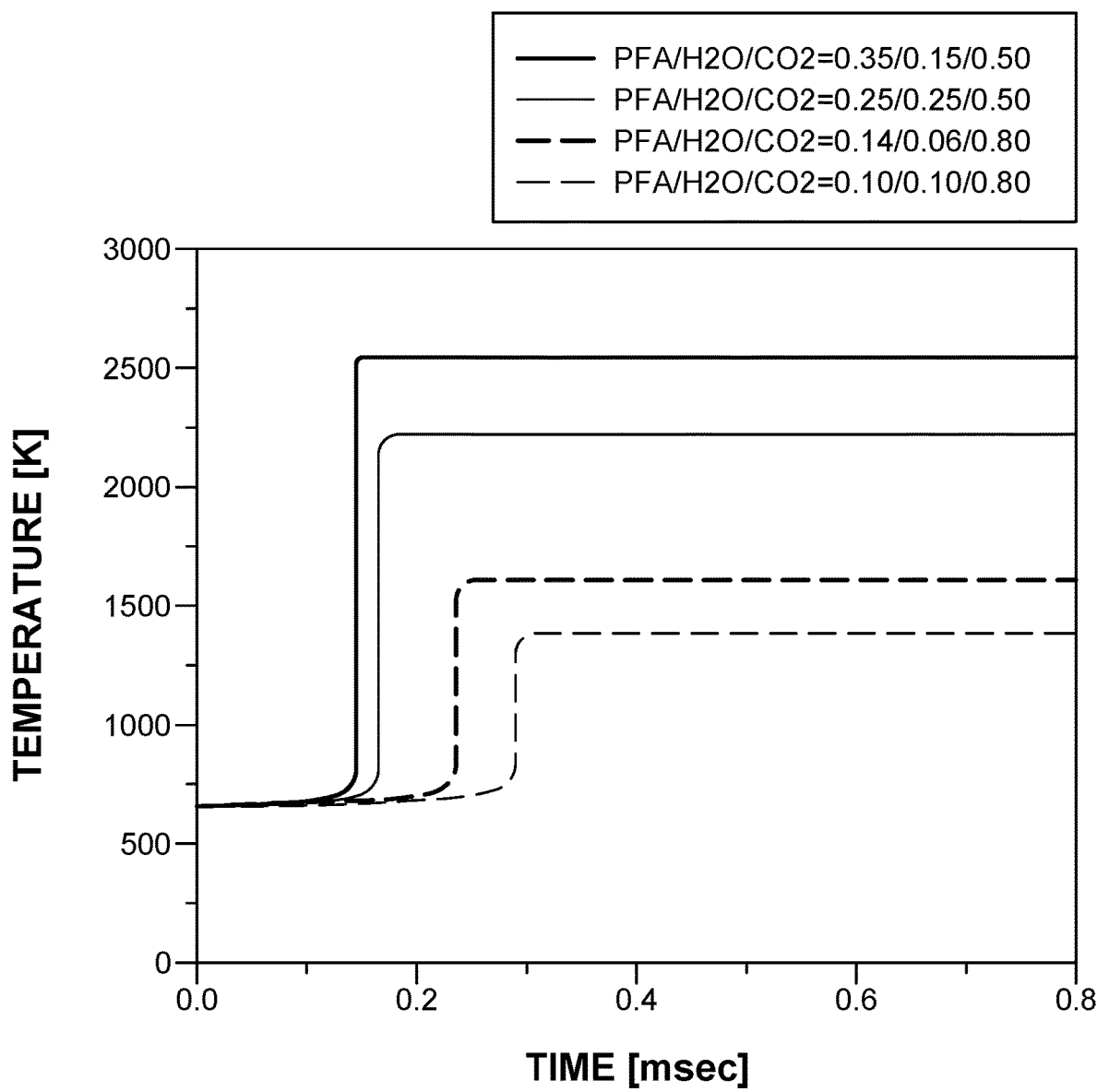
FIG. 7 illustrates the temperature generated by the mixtures of performic acid, water and carbon dioxide when combusted.
Figure 8:
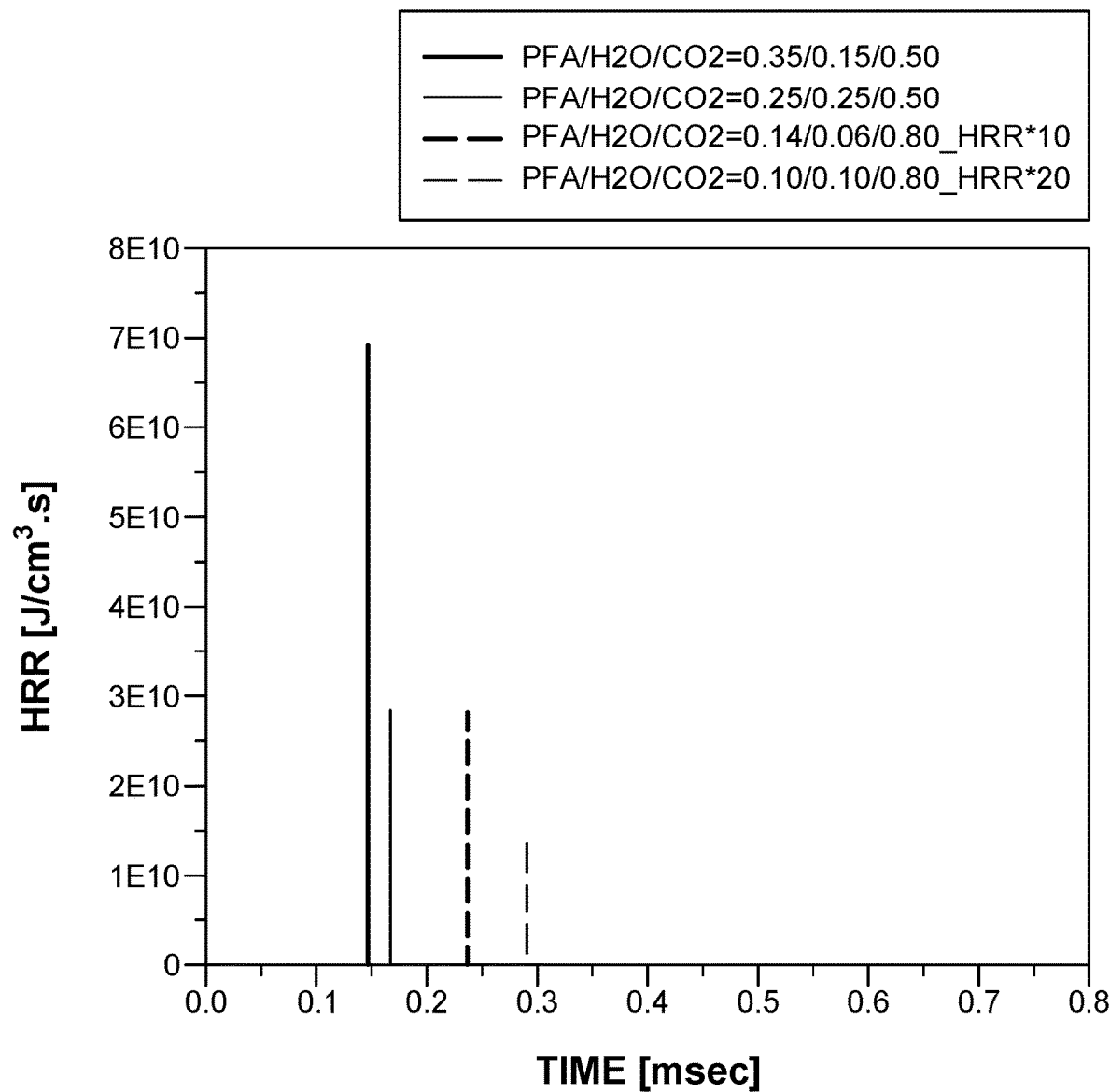
FIG. 8 illustrates the heat transfer rate generated by the mixtures of performic acid, water and carbon dioxide when combusted.

FIG. 7 presents the temperature profiles for the PFA/$H_2O$/$CO_2$ mixtures at an initial temperature of 650 K and pressure of 40 atm. The same mixtures were used in these simulations as for the simulations illustrated in FIG. 6. Mixtures containing less $CO_2$ and larger fractions of PFA exhibit peak temperatures of above 2000 K. As the $CO_2$ percentage increases from 50% to 80%, there is a decrease in the peak temperature to below 1500 K. As expected, the peak temperature decreases as the $H_2O$ percentage increases, indicating the high thermal heat capacity of the water. FIG. 8 presents heat release rates for the same PFA/$H_2O$/$CO_2$ mixtures at an initial temperature of 650 K and a pressure of 40 atm. FIG. 8 shows a one stage-heat release characteristic for the different mixtures at 650 K. It is noted that the mixtures low in $CO_2$ releases more heat.

Figure 9:
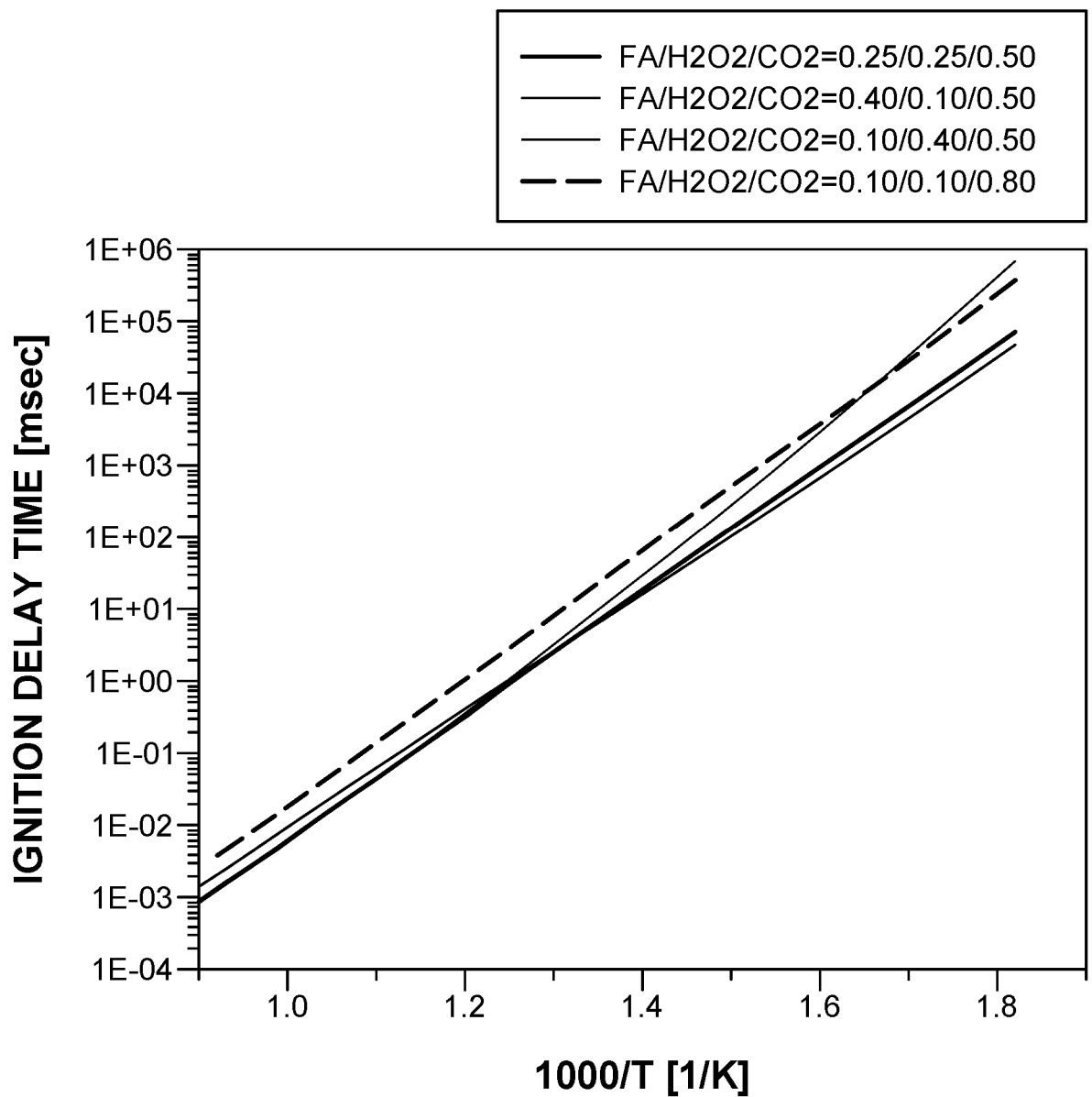
FIG. 9 illustrates the ignition delay time of various mixtures of formic acid, hydrogen peroxide, and carbon dioxide when combusted.
Figure 10:
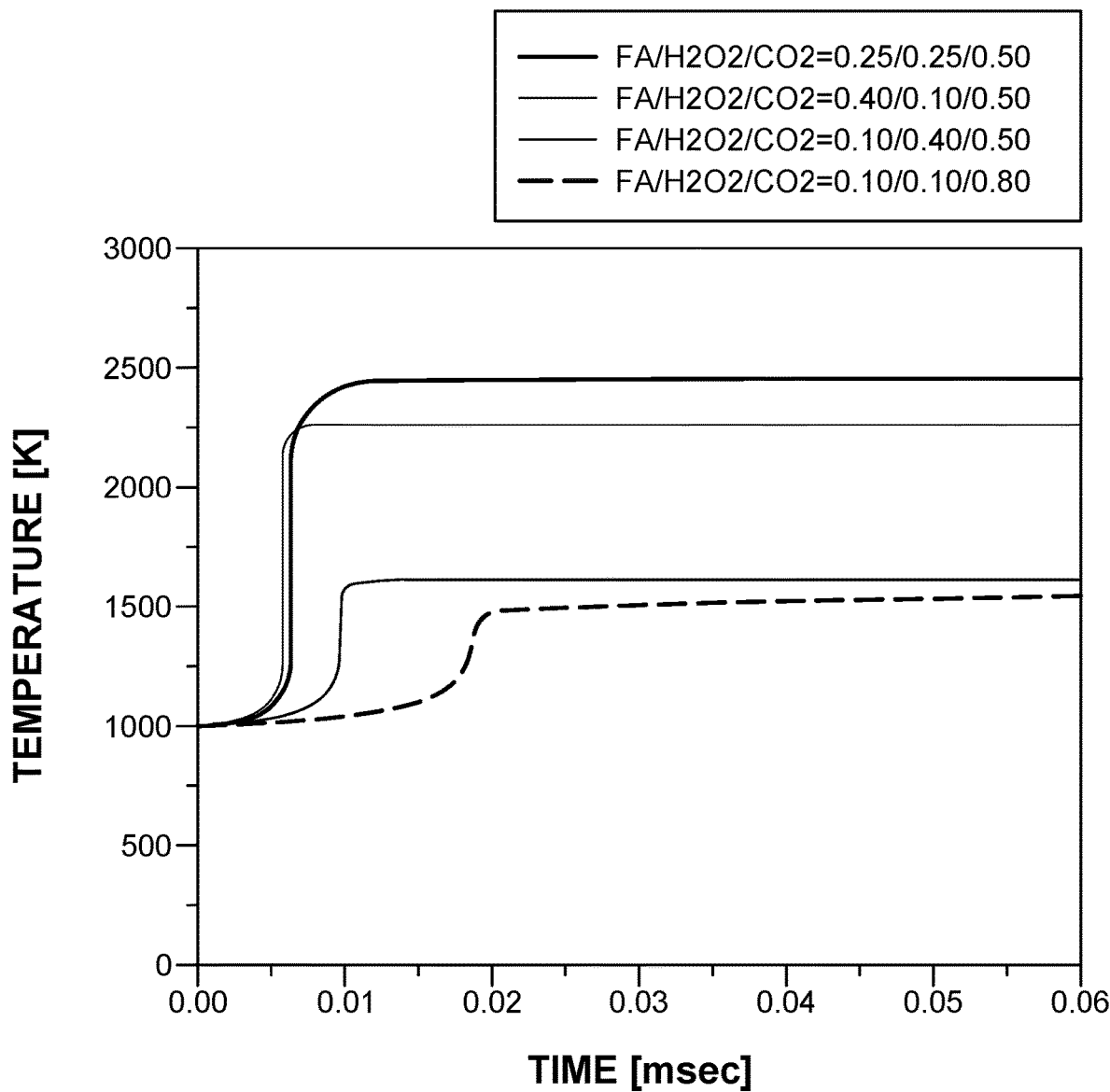
FIG. 10 illustrates the temperature generated by the mixtures of formic acid, hydrogen peroxide and carbon dioxide when combusted.
Figure 11:
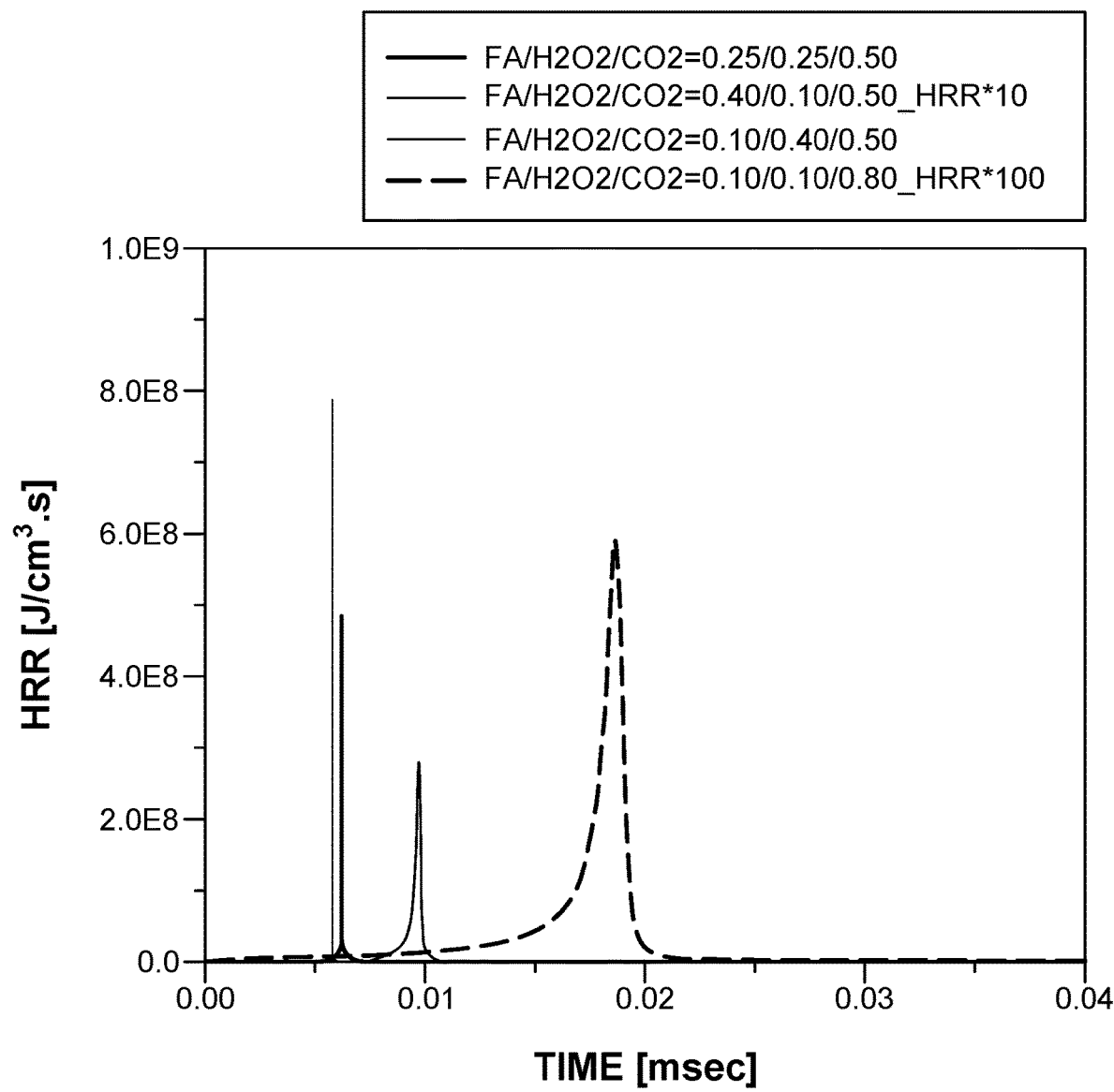
FIG. 11 illustrates the heat transfer rate generated by the mixtures of formic acid, hydrogen peroxide and carbon dioxide when combusted.

The reaction of formic acid and $H_2O_2$ diluted in $CO_2$ is also simulated, as shown in FIG. 9. Compared to the PFA, the FA/$H_2O_2$ mixtures display notably longer ignition delay times. Nevertheless, at 1000 K, the ignition delay time is of the order of 100 microseconds for the FA/$H_2O_2$ mixture. The temperature rise and the heat release rate for the FA/$H_2O_2$/$CO_2$ mixtures at an initial temperature 1000 K are shown in FIGS. 10 and 11, respectively. Similar to the PFA mixtures, the mixtures of FA/$H_2O_2$ display peak temperatures in the range of 1500 to 2300 K, depending on the level of $CO_2$ dilution, and the heat release rate profile shown in FIG. 11 indicates a single-stage heat release phenomenon.

Thus, an emission-free, closed-loop, power generation system based on PFA or FA/$H_2O_2$ mixtures with $CO_2$ as the working fluid was disclosed. A system 400 or 500 for realizing this power cycle with complete $CO_2$ capture and reuse was discussed. Chemical kinetic modeling indicates that mixtures of PFA/$H_2O$/$CO_2$ and FA/$H_2O_2$/$CO_2$ are reactive enough and can generate sufficient heat release for a thermal power cycle. It was shown that it is even possible to implement the systems 400 or 500 on a vehicle. In one embodiment, it is possible to modify an existing internal combustion engine to work with the fuels noted above, using a closed-loop $CO_2$ power cycle, which is emission-free.

Figure 12:
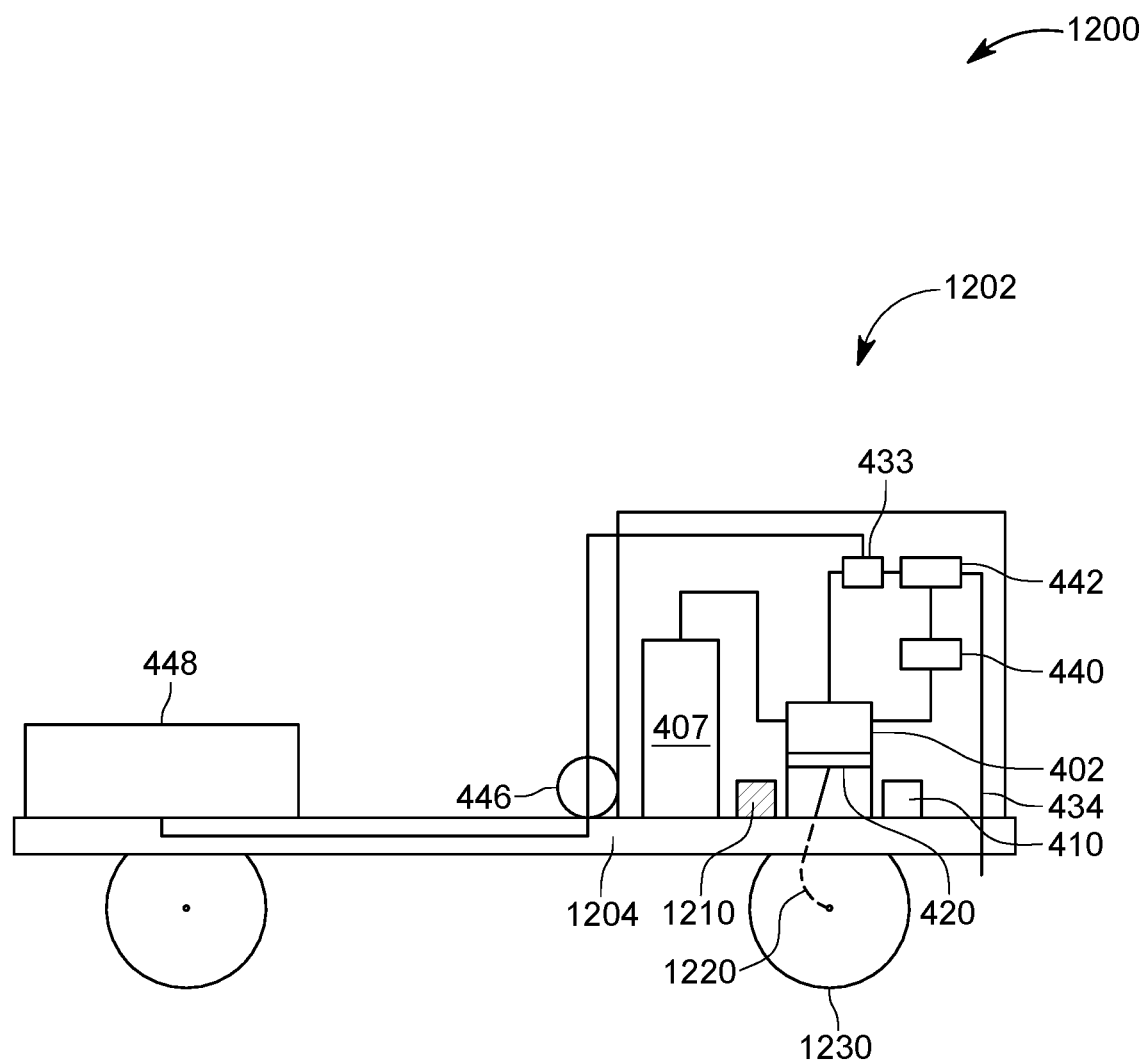
FIG. 12 illustrates a vehicle that has an engine that uses only performic acid as fuel or uses only formic acid and hydrogen peroxide as fuel.

An internal combustion engine that uses either system 400 or 500 is now discussed with regard to FIG. 12. The engine 1202 is shown in this figure being attached to a vehicle, for example, a car 1200. The carbon dioxide storage tank 448 may be attached anywhere along a frame 1204 of the car 1200. The engine 1202 may also be located anywhere along the frame of the car. An electrical battery 1210 may be provided to supply electrical power to the controller 410 and/or any other component that might need electrical energy. Although FIG. 12 shows the car 1200 being fitted with the internal combustion engine 1202 that uses PFA as fuel, the car may be fitted with an engine similar to system 500, that uses formic acid and hydrogen peroxide as fuel. The movement of the piston 420 may be translated into the rotational motion of the wheels 1230 by known means, for example, the gearbox 1220. Any other known mechanical translation energy device may be used to transform the work generated by the engine 1202 into movement of the vehicle. While FIG. 12 shows the vehicle to be a car, the vehicle may be a truck, ship, submarine, autonomous underwater vehicle, airplane, drone, train, etc. Note that with this kind of engine, absolutely no carbon dioxide is released into the ambient. In fact, no other gas is released into the ambient. The only product that is released by this engine into the environment is water, along pipe 434. The generated carbon dioxide is partially recycled to the combustion chamber 402 and the rest of it is stored in the carbon dioxide storage tank 448. Because no air is used inside the combustion chamber 402, there is no nitrogen or nitrogen derivatives that need to be scrubbed from the exhaust, as in the case of a traditional engine, for preventing the pollution of the environment.

Figure 13:
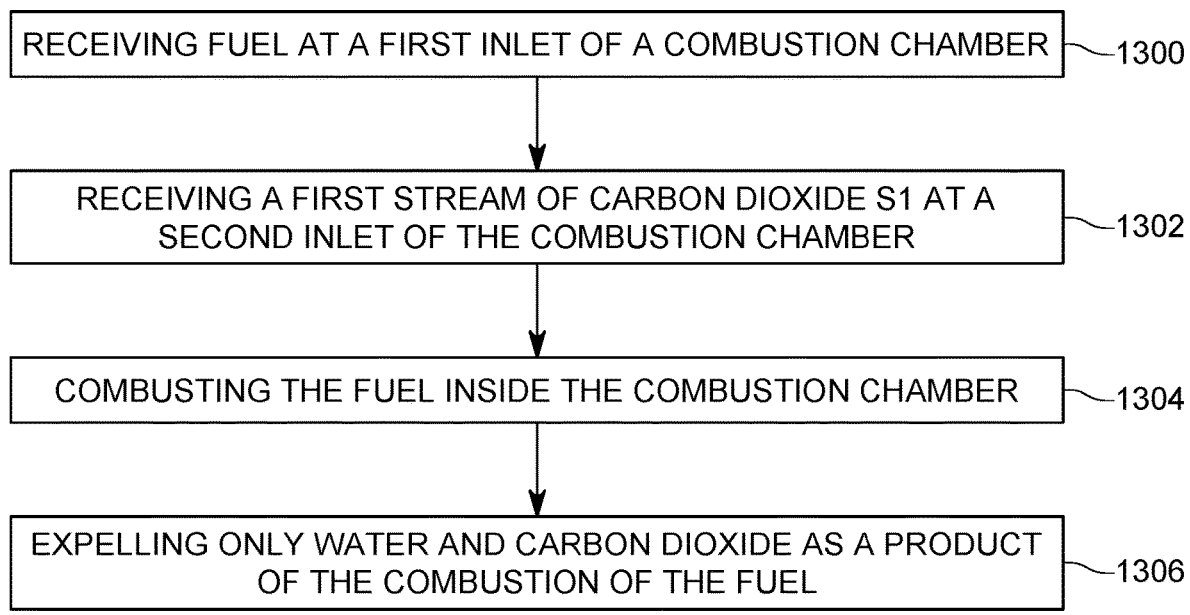
FIG. 13 is a flowchart of a method for using an emission-free, closed-loop carbon dioxide cycle for generating heat and/or work.

A method for generating heat and/or work by using an emission-free power generation system is now discussed with regard to FIG. 13. The method includes a step 1300 of receiving fuel at the first inlet 402A of the combustion chamber 402, a step 1302 of receiving a first stream of carbon dioxide S1 at a second inlet 402B of the combustion chamber 402, a step 1304 of combusting the fuel inside the combustion chamber 402 in the presence of the first stream of carbon dioxide S1, and a step 1306 of expelling only water and carbon dioxide as a product of the combustion of the fuel. A closed-loop fluidic circuit 450 fluidly connects between the second inlet 402B of the combustion chamber 402 and an outlet 402C of the combustion chamber 402, so that none of the carbon dioxide is released outside the power generation system. The fuel includes performic acid or a combination of formic acid and hydrogen peroxide.

In one application, the fuel includes only performic acid and water or the fuel includes only formic acid and hydrogen peroxide. In another application, the method further includes recycling the carbon dioxide to generate the first stream of carbon dioxide and storing the remaining carbon dioxide as a second stream in a storage tank.

The disclosed embodiments provide an emission-free, closed-loop carbon dioxide power generation system. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An emission-free power generation system comprising:
    a combustion chamber having a first inlet for receiving a fuel; and
    a closed-loop fluidic circuit fluidly connected between a second inlet of the combustion chamber and an outlet of the combustion chamber,
    wherein combustion gases from the combustion chamber include only water and carbon dioxide, and
    wherein the fuel includes performic acid or a combination of formic acid and hydrogen peroxide.

2. The emission-free power generation system of claim 1, wherein the fuel includes only performic acid, or only performic acid and water, or only performic acid and carbon dioxide, or only performic acid, carbon dioxide, and water.

3. The emission-free power generation system of claim 1, wherein the fuel includes only formic acid and hydrogen peroxide, or only formic acid, hydrogen peroxide and water, or only formic acid, hydrogen peroxide, and carbon dioxide, or only formic acid, hydrogen peroxide, carbon dioxide, and water.

4. The emission-free power generation system of claim 1, wherein the closed-loop fluidic circuit comprises:
    plural pipes;
    a heat exchanger;
    a condenser; and
    a valve.

5. The emission-free power generation system of claim 4, wherein the heat exchanger is configured to reduce a temperature of the combustion gases to generate cooler combustion gases.

6. The emission-free power generation system of claim 5, wherein the condenser is configured to remove the water from the cooler combustion gases, to obtain only carbon dioxide.

7. The emission-free power generation system of claim 6, wherein the valve is configured to split the carbon dioxide into a first stream and a second stream.

8. The emission-free power generation system of claim 7, further comprising:
    a compressor for compressing the second stream; and
    a carbon dioxide storing tank for storing the carbon dioxide from the second stream.

9. The emission-free power generation system of claim 7, wherein the first stream is returned to the second inlet of the combustion chamber.

10. The emission-free power generation system of claim 7, further comprising:
    a controller connected to the valve and configured to select a ratio between the first and second streams.

11. The emission-free power generation system of claim 1, wherein the combustion chamber comprises a piston for generating work due to a force exerted by the combustion gases.

12. The emission-free power generation system of claim 1, wherein an environment inside the combustion chamber is kept at a temperature larger than 300° C. and a pressure equal to or larger than 1 atm.

13. The emission-free power generation system of claim 1, wherein the combustion chamber is part of an internal combustion engine.

14. An emission-free vehicle comprising:
    a frame connected to one or more wheels;
    a combustion chamber attached to the frame and having a first inlet for receiving a fuel;
    a closed-loop fluidic circuit fluidly connected between a second inlet of the combustion chamber and an outlet of the combustion chamber; and
    a gearbox that transfers work generated by the combustion chamber to one or more wheels to generate propulsion,
    wherein combustion gases from the combustion chamber include only water and carbon dioxide, and
    wherein the fuel includes performic acid or a combination of formic acid and hydrogen peroxide.

15. The vehicle of claim 14, wherein the fuel includes only performic acid, or only performic acid and water, or only performic acid and carbon dioxide, or only performic acid, carbon dioxide, and water.

16. The vehicle of claim 14, wherein the fuel includes only formic acid and hydrogen peroxide, or only formic acid, hydrogen peroxide and water, or only formic acid, hydrogen peroxide, and carbon dioxide, or only formic acid, hydrogen peroxide, carbon dioxide, and water.

17. The vehicle of claim 14, wherein the closed-loop fluidic circuit comprises:
    plural pipes;
    a heat exchanger configured to reduce a temperature of the combustion gases to generate cooler combustion gases;

a condenser configured to remove the water from the cooler combustion gases, to obtain only carbon dioxide; and a valve configured to split the carbon dioxide into a first stream and a second stream, wherein the first stream is returned to the second inlet of the combustion chamber and the second stream is stored in a carbon dioxide storage container attached to the frame.

18. A method for generating heat by using an emission-free power generation system, the method comprising:

receiving a fuel at a first inlet of a combustion chamber;

receiving a first stream of carbon dioxide at a second inlet of the combustion chamber;

combusting the fuel inside the combustion chamber in the presence of the first stream of the carbon dioxide; and expelling only water and carbon dioxide as a product of the combustion of the fuel, wherein a closed-loop fluidic circuit fluidly connects between the second inlet of the combustion chamber and an outlet of the combustion chamber, so that none of the carbon dioxide is released outside the power generation system, and wherein the fuel includes performic acid or a combination of formic acid and hydrogen peroxide.

19. The method of claim 18, wherein the fuel includes only performic acid, or only performic acid and water, or only performic acid and carbon dioxide, or only performic acid, carbon dioxide, and water, or only formic acid and hydrogen peroxide, or only formic acid, hydrogen peroxide and water, or only formic acid, hydrogen peroxide, and carbon dioxide, or only formic acid, hydrogen peroxide, carbon dioxide, and water.

20. The method of claim 18, further comprising:

recycling the carbon dioxide to generate the first stream of carbon dioxide and storing the remaining carbon dioxide in storage tank.

* * * * *